No. 799,763. PATENTED SEPT. 19, 1905.
O. STEINER.
COUNTERPANE.
APPLICATION FILED APR. 6, 1903.

Witnesses
H. van Heerenbrinck
Thomas Kirkpatrick

Inventor
Ottomar Steiner
by H. van Oldenneel
atty.

UNITED STATES PATENT OFFICE.

OTTOMAR STEINER, OF FRANKENBERG, GERMANY.

COUNTERPANE.

No. 799,763.  Specification of Letters Patent.  Patented Sept. 19, 1905.

Application filed April 6, 1903. Serial No. 151,311.

*To all whom it may concern:*

Be it known that I, OTTOMAR STEINER, a subject of the King of Saxony, residing at Frankenberg, in the Kingdom of Saxony and Empire of Germany, have invented new and useful Improvements in Counterpanes, of which the following is a specification.

My invention relates to counterpanes, and is based upon the fact that the conduction of the heat is not precluded by the down, wool, or other material alone, but chiefly by the air inclosed in the interstices of such material. As, however, a stratum of air which is inclosed on all sides in a counterpane gets stuffy and does not relinquish any moisture which it may take up, thus rendering the use of such a counterpane unpleasant, provision must be made for the occasional renewal of the air inclosed in the said materials. By my said invention I attain this object by composing cushions, made of wool, down, or the like, in such a manner that spaces are left between them, the air inclosed in such spaces being renewed as often as may be desired by airing the whole counterpane. The body of cushions placed together according to certain rules is put in a cover, which may constitute a quilt. In summer this quilt may be used alone, while in winter it is used together with the body of cushions.

In the accompanying drawings I have shown by way of example how my said invention may be carried into effect.

Figure 1:
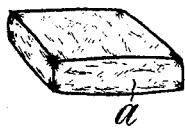
Figure 2:
Figure 3:
Figure 5:
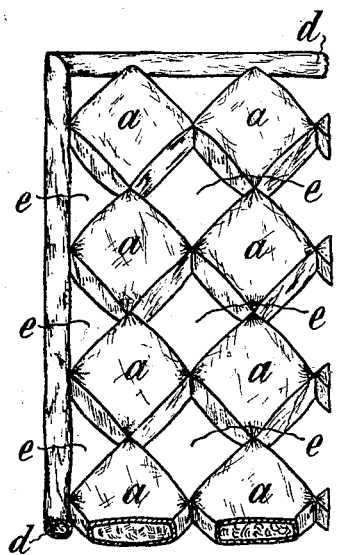
Figure 6:
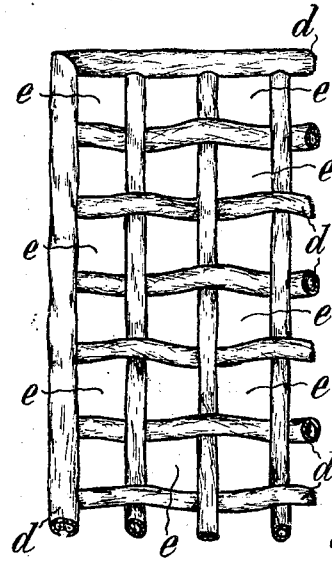
Figure 7:
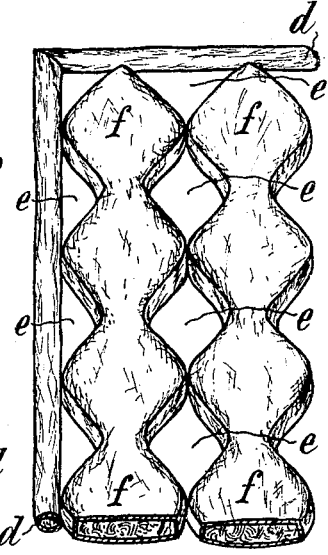
Figure 8:
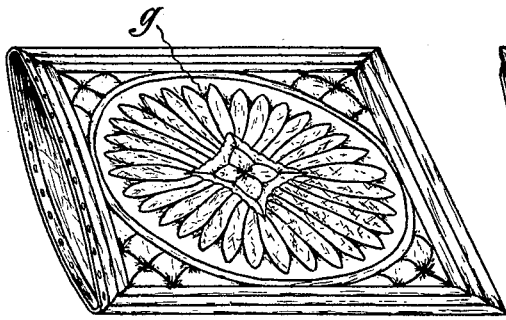

Figure 1 represents a square cushion; Fig. 2, a hexagonal cushion; Fig. 3, a round cushion, and Fig. 4 a cushion in the form of tubing or a roll. Fig. 5 represents part of a counterpane chiefly composed of square cushions. Fig. 6 shows part of a counterpane chiefly composed of plain tubing. Fig. 7 shows part of a counterpane chiefly composed of tubing widened at some points and contracted at others. Fig. 8 illustrates a counterpane with a quilted cover, and Fig. 9 a counterpane with a cover made on one side of quilt and on the other side of linen.

Figure 4:

The elements of which the counterpane is composed form small cushions $a\ b\ c\ d$, made of square shape, Fig. 1, or hexagonal shape, Fig. 2, or round shape, Fig. 3, or tubular shape, Fig. 4, or of any similar shape or configuration, the said cushions being filled with down, wool, or the like. By way of example I have shown in Fig. 5 a constructional form wherein square cushions $a$ are connected with each other at their corners, so as to leave square holes $e$ between them, the border of the counterpane consisting of rolls or tubes $d$, such as shown in Fig. 4, which are connected with the corners of the outer cushions.

A counterpane consisting entirely of tubing $d$ is represented in Fig. 6. This tubing is interlaced in such a manner as to again leave square holes $e$, the ends of the several lengths of tubing being connected to like tubing, which forms the border.

As shown in Fig. 7, the counterpane may be composed of tubing $f$, which is contracted at certain points and widened at other points, where the several lengths may be connected with each other, holes $e$ remaining between every two lengths at the points where they are contracted. A border made of plain tubing $d$, such as shown in Fig. 4, joins the outer ends of the several lengths of tubing and the sides of the two outer lengths.

It will be readily understood that by the use of differently-shaped elements or cushions the construction of the counterpane and the configuration of the air-holes formed between such cushions may be varied at will.

Figure 9:
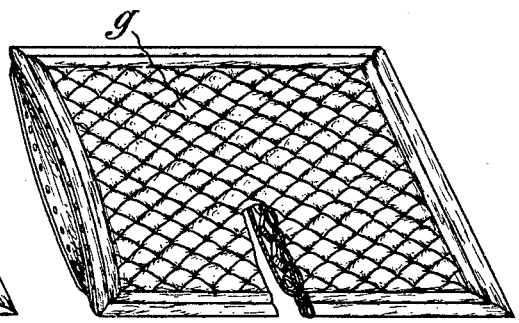

The body of cushions thus composed is inclosed in a covering $g$, both sides of which may be made of quilted fabric, as represented in Fig. 8, or one side may consist of quilted fabric and the other side of linen fabric, as represented in Fig. 9.

A counterpane constructed in this manner with interstices or holes between the several cushions wherein the air is inclosed on all sides forms a most effective non-conductor of heat, and thus possesses a great advantage in this respect as compared with the counterpanes employed.

What I claim as my invention, and desire to secure by Letters Patent, is—

In a counterpane of the character described, the combination of a sheet composed of a plurality of small thin square cushions touching each other at their corners only, so that air-spaces are left between their adjacent edges, and two close-textured quilted sheets of fabric inclosing the aforesaid sheet of square cushions, the air which forms a bad conductor of heat being thus practically confined within the said spaces, substantially as and for the purpose herein set forth.

In testimony whereof I have signed my name to this specification in the presence of two subscribing witnesses.

OTTOMAR STEINER.

Witnesses:
  E. C. MEYER,
  FREDERICK J. SIETZMAN.